(12) United States Patent
Wentink et al.

(10) Patent No.: US 8,965,283 B2
(45) Date of Patent: Feb. 24, 2015

(54) SETTING UP A DIRECT LINK IN A PEER TO PEER WIRELESS NETWORK

(75) Inventors: Maarten Menzo Wentink, Naarden (NL); Vincent Knowles Jones, IV, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 430 days.

(21) Appl. No.: 12/851,358

(22) Filed: Aug. 5, 2010

(65) Prior Publication Data

US 2011/0034127 A1    Feb. 10, 2011

Related U.S. Application Data

(60) Provisional application No. 61/232,527, filed on Aug. 10, 2009.

(51) Int. Cl.
*H04B 7/00* (2006.01)
*H04W 76/02* (2009.01)

(52) U.S. Cl.
CPC .......... *H04W 76/022* (2013.01); *H04W 76/023* (2013.01)
USPC ........... 455/41.2; 455/518; 455/519; 455/526

(58) Field of Classification Search
USPC ........................................ 455/41.2, 518–519
See application file for complete search history.

(56) References Cited

U.S. PATENT DOCUMENTS

| 4,603,325 | A | * | 7/1986 | Marino et al. ........... 340/539.21 |
| 5,561,841 | A | * | 10/1996 | Markus .......................... 455/446 |
| 7,522,571 | B2 | * | 4/2009 | Ginzburg ....................... 370/338 |
| 2003/0224806 | A1 | * | 12/2003 | Hebron ........................... 455/457 |
| 2006/0002328 | A1 | * | 1/2006 | Naghian ........................ 370/328 |
| 2007/0008922 | A1 | | 1/2007 | Abhishek et al. |
| 2007/0089157 | A1 | * | 4/2007 | Clark ............................. 725/135 |
| 2007/0140197 | A1 | * | 6/2007 | Sawada ......................... 370/338 |
| 2008/0002658 | A1 | | 1/2008 | Soliman |
| 2008/0069021 | A1 | * | 3/2008 | Chhabra ....................... 370/311 |

(Continued)

FOREIGN PATENT DOCUMENTS

| CN | 101043414 A | 9/2007 |
| CN | 101119271 A | 2/2008 |
| WO | 2009008662 | 1/2009 |

OTHER PUBLICATIONS

IEEE P802.11z/D4.0 Draft Standard for Information Technology—Telecommunications and information exchange between systems—Local and metropolitan area networks—Specific requirements, Feb. 2009.*

(Continued)

*Primary Examiner* — Fayyaz Alam
*Assistant Examiner* — Mohammed Rachedine
(74) *Attorney, Agent, or Firm* — Howard Seo

(57) ABSTRACT

A method for setting up a direct link between a first client station and a second client station is described. The method is performed by the first client station. The first client station communicates with a group owner (GO) via a first peer to peer (P2P) wireless link. Whether to set up a tunneled direct link setup (TDLS) direct link between the first client station and the second client station is determined. The TDLS direct link between the first client station and the second client station is set up. The first client station then communicates directly with the second client station via the TDLS direct link.

40 Claims, 12 Drawing Sheets

(56) References Cited

U.S. PATENT DOCUMENTS

| | | | |
|---|---|---|---|
| 2008/0219228 A1* | 9/2008 | Seok et al. | 370/338 |
| 2009/0022125 A1 | 1/2009 | Seok | |
| 2009/0073945 A1 | 3/2009 | Seok | |
| 2009/0231995 A1* | 9/2009 | Chu et al. | 370/225 |
| 2010/0153727 A1* | 6/2010 | Reznik et al. | 713/171 |
| 2011/0195707 A1* | 8/2011 | Faerber et al. | 455/423 |

OTHER PUBLICATIONS

International Search Report and Written Opinion—PCT/US2010/044682, International Search Authority—European Patent Office—Nov. 24, 2010.

Ravichandiran C, et al., "An Incisive SWOT Analysis of Wi-Fi, Wireless Mesh, WiMAX and Mobile WiMAX Technologies", Education Technology and Computer, 2009 International Conference on, IEEE, Piscataway, NJ, USA, Apr. 17, 2009, pp. 239-243, XP031493582, ISBN: 978-0-7695-3609-5 p. 239-p. 241.

IEEE P802.11z /D8.0, Draft Standard for Information Technology—Telecommunications and information exchange between systems—Local and metropolitan area networks—Specific requirements—Part 11: Wireless Medium Access Control (MAC) and physical layer (PHY) specifications, Amendment 7: Extensions to Direct Link Setup, Apr. 2010.

Yen L H., et al., "Load Balancing in IEEE 802.11 Networks", IEEE Internet Computing, Jan. 9, 2009, vol. 13, No. 1, p. 56-64.

\* cited by examiner

SETTING UP A DIRECT LINK IN A PEER TO PEER WIRELESS NETWORK

RELATED APPLICATIONS

This application is related to and claims priority from U.S. Provisional Patent Application Ser. No. 61/232,527, entitled "DIRECT LINK IN A WIFI PEER TO PEER NETWORK", filed Aug. 10, 2009, and is expressly incorporated by reference herein in its entirety.

TECHNICAL FIELD

The present disclosure relates generally to wireless communication systems. More specifically, the present disclosure relates to systems and methods for setting up a direct link in a peer to peer (P2P) wireless network.

BACKGROUND

Wireless communication systems are widely deployed to provide various types of communication content such as voice, video, data and so on. These systems may be multiple-access systems capable of supporting simultaneous communication of multiple wireless communication devices with one or more base stations.

Oftentimes two or more wireless communication devices may form a peer to peer (P2P) network. In a peer to peer network, the wireless communication devices may transfer data directly with each other without a dedicated base station. In some instances, one of the wireless communication devices may act as a group owner (GO) while the other wireless communication devices act as client stations.

Each client station may form a link with the group owner (GO) and transfer data directly with the group owner (GO). Oftentimes, data must be sent to the group owner (GO) and then forwarded to another wireless device. Such forwarding may cause delays that decrease the efficiency of the network while increasing the use of airtime. Benefits may be realized by improvements to P2P networks.

SUMMARY

Wireless communication systems are widely deployed to provide various types of communication content such as voice, video, data, and so on. These systems may be multiple-access systems capable of supporting simultaneous communication of multiple wireless communication devices with one or more base stations.

A method for setting up a direct link between a first client station and a second client station is described. The method is performed by the first client station. The method includes communicating with a group owner (GO) via a first peer to peer (P2P) wireless link. The method also includes determining whether to set up a tunneled direct link setup (TDLS) direct link between the first client station and the second client station. The TDLS direct link is set up between the first client station and the second client station. The method also includes communicating directly with the second client station via the TDLS direct link.

The wireless link may be a wireless fidelity (Wi-Fi) link. Setting up the TDLS direct link may include sending a TDLS setup request to the GO, receiving a TDLS setup response from the GO and sending a TDLS setup confirmation to the GO. Determining whether to set up a TDLS direct link may include generating a TDLS setup request based on network conditions.

The network conditions may include a received signal strength from the GO, a received signal strength from the second client station, a current data rate via the GO, or a potential data rate via the TDLS direct link. The network conditions may also include channel availability and a forwarding latency for communications with the second client station via the GO. Determining whether to set up a TDLS direct link may include receiving a TDLS setup request from the GO.

Setting up the TDLS direct link may include receiving a TDLS setup request from the GO, sending a TDLS setup response to the GO and receiving a TDLS setup confirmation from the GO. The TDLS setup request and the TDLS setup confirmation may be generated by the second client station. The TDLS setup request and the TDLS setup confirmation may be generated by the GO. The TDLS setup request may include the intended recipient, information about the TDLS direct link, a channel for the TDLS direct link, a frequency for the TDLS direct link, or timing structures for the TDLS direct link.

A TDLS teardown frame may be received from the GO. The TDLS teardown frame may end communication via the TDLS direct link. The second client station may communicate with the GO via a second P2P Wi-Fi link. The TDLS setup response may indicate that TDLS direct links are not allowed and a TDLS direct link is not set up. The TDLS teardown frame may dissolve the TDLS direct link.

A method for controlling the setup of direct links by a group owner is described. The method includes communicating with a first client station via a first peer to peer (P2P) wireless link. The method also includes communicating with a second client station via a second P2P wireless link. A first TDLS setup request is sent to the first client station. A first TDLS setup response is received from the first client station. A first TDLS setup confirmation is sent to the first client station.

The first P2P wireless link may be a wireless fidelity (Wi-Fi) link. The second P2P wireless link may be a Wi-Fi link. The first TDLS setup request may be received from the second client station. The first TDLS setup confirmation may be received from the second client station. The first TDLS setup response may be sent to the second client station. A first TDLS teardown frame may be sent to the first client station.

A second TDLS teardown frame may be sent to the second client station. The first TDLS setup request may be generated by the GO or by the first client station. The first TDLS setup confirmation may also be generated by the GO. A second TDLS setup request may be sent to the second client station. A second TDLS setup response may be received from the second client station. A second TDLS setup confirmation may be sent to the second client station. The first client station may be the intended recipient of the second TDLS response. The GO may not forward the second TDLS response to the first client station. The second TDLS setup response may be generated by the second client station. The second client station may be the intended recipient of the first TDLS response. The GO may not forward the first TDLS response to the second client station.

A wireless device configured for setting up a direct link is described. The wireless device includes a processor, memory in electronic communication with the processor and instructions stored in the memory. The instructions are executable by the processor to communicate with a group owner (GO) via a first peer to peer (P2P) wireless link. The instructions are also executable by the processor to determine whether to set up a tunneled direct link setup (TDLS) direct link between a first client station and a second client station. The instructions are further executable by the processor to set up the TDLS direct link between the first client station and the second client station. The instructions are also executable by the processor to communicate directly with the second client station via the TDLS direct link.

A wireless device configured for setting up a direct link is also described. The wireless device includes means for communicating with a group owner (GO) via a first peer to peer (P2P) wireless link. The wireless device also includes means for determining whether to set up a tunneled direct link setup (TDLS) direct link between a first client station and a second client station. The wireless device further includes means for setting up the TDLS direct link between the first client station and the second client station. The wireless device also includes means for communicating directly with the second client station via the TDLS direct link.

A computer-program product for a wireless device configured for setting up a direct link is described. The computer-program product includes a computer-readable medium having instructions thereon. The instructions include code for communicating with a group owner (GO) via a first peer to peer (P2P) wireless link. The instructions also include code for determining whether to set up a tunneled direct link setup (TDLS) direct link between a first client station and a second client station. The instructions further include code for setting up the TDLS direct link between the first client station and the second client station. The instructions also include code for communicating directly with the second client station via the TDLS direct link.

DETAILED DESCRIPTION

Figure 1:
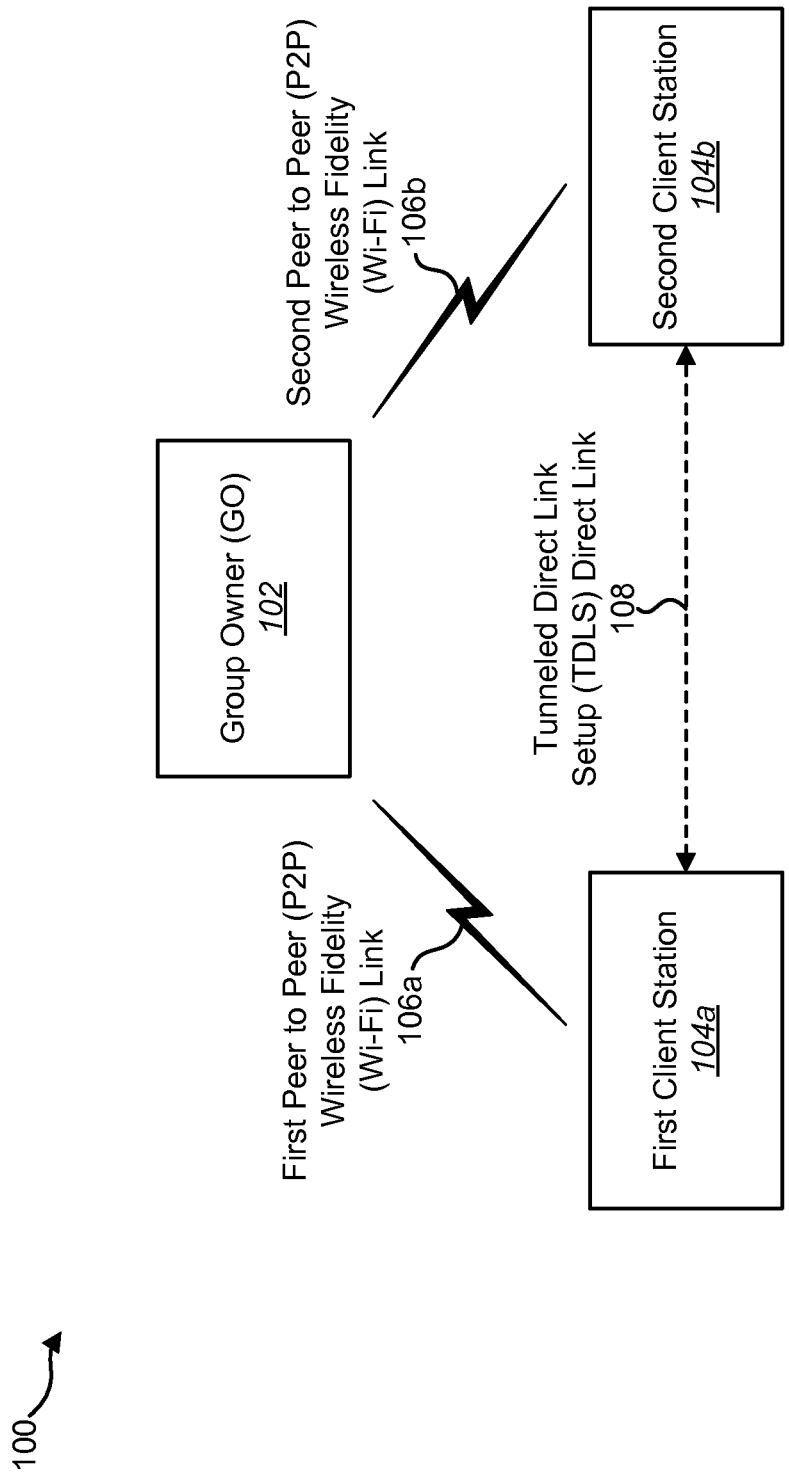
FIG. 1 illustrates a wireless communication system including multiple wireless devices.

FIG. 1 illustrates a wireless communication system 100 including multiple wireless devices. Wireless communication systems 100 are widely deployed to provide various types of communication content such as voice, data and so on. These systems may be multiple-access systems capable of supporting communication with multiple users by sharing the available system resources (e.g., bandwidth and transmit power). The wireless devices may include a group owner (GO) 102 and two or more client stations 104. The group owner (GO) 102 may be an access point. For example, the group owner (GO) 102 may be a laptop, a cellular phone or a laptop that is capable of acting as a group owner (GO) 102.

The group owner (GO) 102 may not be a dedicated access point. In other words, the group owner (GO) 102 may be a portable device without a direct cable connection to a core network. Any wireless device may operate as the group owner (GO) 102. For example, when a wireless communication system 100 is established, one or more wireless devices may be potential group owners (GO) 102. Various protocols may exist for determining the wireless device that will act as the group owner (GO) 102. For example, if one of the wireless devices is a laptop and the other wireless devices are cellular phones, the laptop may be the designated group owner (GO) 102 due to the increased power potential of the laptop versus the cellular phones. As another example, one of the wireless devices may desire to be the group owner (GO) 102. In this case, the wireless device desiring to be the group owner (GO) 102 may become the group owner (GO) 102 as long as minimum standards are met. The selection of the group owner (GO) 102 may be based on battery power, signal strength, location, processing power or other metrics.

A client station 104 may be a wireless device. For example, a client station 104 may be a cellular phone, a PDA, a laptop, a gaming device, a smartphone, etc. A client station 104 may also be referred to as a wireless communication device.

The wireless communication system 100 may use a peer to peer (P2P) wireless network for communication between the wireless devices. In one configuration, the wireless network may be a wireless local area network (WLAN) such as a wireless fidelity (Wi-Fi) network. For example, the wireless network may comply with the standards set forth in the Institute of Electrical and Electronics Engineers (IEEE) 802.11 standards. The group owner (GO) 102 may communicate with a first client station 104a via a first peer to peer (P2P) wireless fidelity (Wi-Fi) link 106a while simultaneously communicating with a second client station 104b via a second peer to peer (P2P) wireless fidelity (Wi-Fi) link 106b.

A peer to peer (P2P) network or peer to peer (P2P) link may refer to a network architecture composed of wireless devices that make a portion of their resources (such as processing power, disk storage or network bandwidth) directly available to other network participants without the need for central coordination such as a dedicated access point, a base station or a core network. A peer to peer (P2P) network may be formed dynamically by ad-hoc additions of nodes. In an ad-hoc network, the removal of nodes has no significant impact on the network. In a peer to peer (P2P) network, the devices are not physically attached to the infrastructure. The devices have no wired or wireless connection with the Internet. A peer to peer (P2P) network can grow or shrink as devices are added to or subtracted from the network.

The term wireless fidelity (Wi-Fi) refers to a class of wireless local area network (WLAN) devices that use the IEEE 802.11, 802.11a, 802.11b, 802.11g or 802.11n standards. Examples of Wi-Fi devices include personal computers, video game consoles, smartphones, printers and laptops. Wi-Fi devices may communicate wirelessly in the 2.4, 3.6 and 5 gigahertz (GHz) frequency bands A peer to peer (P2P) wireless fidelity (Wi-Fi) link 106 may incorporate a peer to peer (P2P) link between two or more Wi-Fi devices. A peer to peer (P2P) wireless fidelity (Wi-Fi) link 106 may refer to a communications link within a peer to peer (P2P) wireless fidelity (Wi-Fi) network. In a peer to peer (P2P) wireless fidelity (Wi-Fi) network, one or more client stations 104 may each establish a peer to peer (P2P) wireless fidelity (Wi-Fi) link 106 with a group owner (GO) 102. Thus, the first client station 104a may establish a first peer to peer (P2P) wireless fidelity (Wi-Fi) link 106a with the group owner (GO) 102 and the second client station 104b may establish a second peer to peer (P2P) wireless fidelity (Wi-Fi) link 106b with the group owner (GO) 102.

One problem with peer to peer (P2P) wireless fidelity (Wi-Fi) networks is the efficient transport of traffic between two client stations 104 that are associated with the same group owner (GO) 102. The traffic between the first client station 104a and the second client station 104b must be sent to the group owner (GO) 102, which then forwards the traffic to the destination client station 104. This forwarding may cause additional latency and consume unnecessary extra airtime. There may also be other traffic on the group owner (GO) 102 channel that decrease the efficient transport of traffic between two client stations 104. A group owner (GO) 102 may also have less advanced capabilities than the two client stations 104a-b, resulting in less efficient traffic transport.

A direct link may instead be set up between the first client station 104a and the second client station 104b. One example of such a direct link is the use of the tunneled direct link setup (TDLS) protocol. The tunneled direct link setup (TDLS) protocol is currently being standardized as 802.11z for access point (AP) networks but has not been adapted for group owner (GO) 102 networks. A tunneled direct link setup (TDLS) link can be short, which allows either less output power to be used or a higher data rate that results in a more efficient use of spectrum. The tunneled direct link setup (TDLS) protocol may be characterized by encapsulating setup frames in regular data frames, which allows the setup frames to be transmitted through the group owner (GO) 102 transparently. For this reason, the group owner (GO) 102 does not need to be TDLS capable or aware. Furthermore, the group owner (GO) 102 does not need to have the same set of capabilities that will be used on the direct link between the first client station 104a and the second client station 104b.

Once a tunneled direct link setup (TDLS) direct link 108 has been established between the first client station 104a and the second client station 104b, the first client station 104a and the second client station 104b may remain associated with the group owner (GO) 102. For example, the first peer to peer (P2P) wireless fidelity (Wi-Fi) link 106a may continue to exist between the first client station 104a and the group owner (GO) 102. Likewise, the second peer to peer (P2P) wireless fidelity (Wi-Fi) link 106b may continue to exist between the second client station 104b and the group owner (GO) 102.

The tunneled direct link setup (TDLS) direct link 108 may use the same frequency band as the peer to peer (P2P) wireless fidelity (Wi-Fi) links 106. The tunneled direct link setup (TDLS) direct link 108 may also use the same channel as the peer to peer (P2P) wireless fidelity (Wi-Fi) links 106. Other frequency bands and channel bandwidths may also be used for the tunneled direct link setup (TDLS) direct link 108. For example, a tunneled direct link setup (TDLS) direct link 108 can be switched to another channel in the same or another band.

Figure 2:
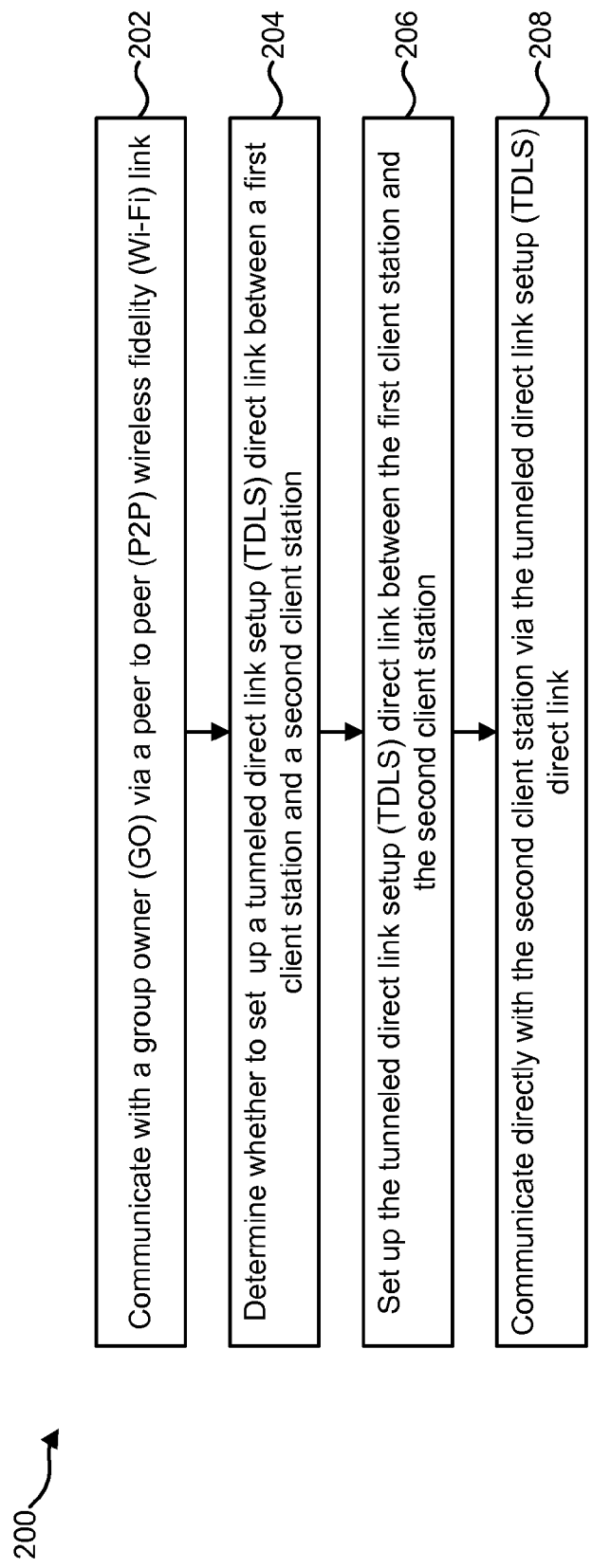
FIG. 2 is a flow diagram of a method for setting up a tunneled direct link setup (TDLS) direct link between a first client station and a second client station.

FIG. 2 is a flow diagram of a method 200 for setting up a tunneled direct link setup (TDLS) direct link 108 between a first client station 104a and a second client station 104b. The method 200 may be performed by the first client station 104a. The first client station 104a may communicate 202 with a group owner (GO) 102 via a first peer to peer (P2P) wireless fidelity (Wi-Fi) link 106a. The first client station 104a may determine 204 whether to set up a tunneled direct link setup (TDLS) direct link 108 between the first client station 104a and a second client station 104b. Determining 204 whether to set up a tunneled direct link setup (TDLS) direct link 108 may include receiving a tunneled direct link setup (TDLS) setup request or generating a tunneled direct link setup (TDLS) setup request based on network conditions. Network conditions and tunneled direct link setup (TDLS) setup requests are discussed in additional detail below in relation to FIG. 3.

If it is determined that a tunneled direct link setup (TDLS) direct link 108 should be set up, the first client station 104a may set up 206 the tunneled direct link setup (TDLS) direct link 108. Setting up a tunneled direct link setup (TDLS) direct link 108 is discussed in additional detail below in relation to FIG. 4. The tunneled direct link setup (TDLS) direct link 108 may use the same frequency band as the peer to peer (P2P) wireless fidelity (Wi-Fi) network. Once the tunneled direct link setup (TDLS) direct link 108 is set up, the first client station 104a may communicate 208 directly with the second client station 104b via the tunneled direct link setup (TDLS) direct link 108.

Figure 3:
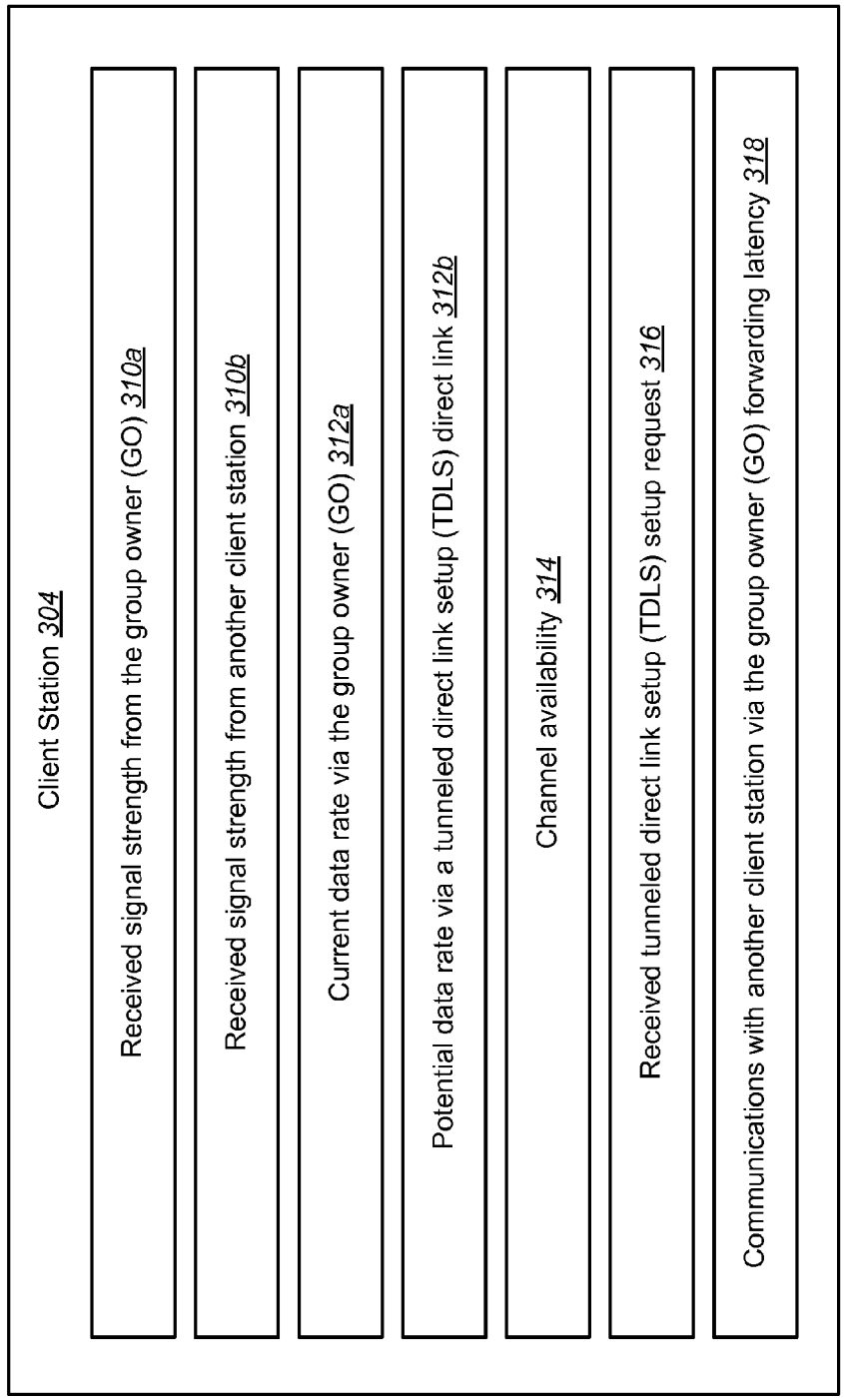
FIG. 3 is a block diagram illustrating various components of a client station for use in the present systems and methods.

FIG. 3 is a block diagram illustrating various components of a client station 304 for use in the present systems and methods. The client station 304 of FIG. 3 may be one configuration of the first client station 104a or the second client station 104b of FIG. 1. The client station 304 may determine whether to set up a tunneled direct link setup (TDLS) direct link 108 with another client station 104 based on one or more metrics. For example, the client station 304 may determine whether to set up a tunneled direct link setup (TDLS) direct link 108 with another client station 104 based on the received signal strength 310a from the group owner (GO) 102, the received signal strength 310b from a second client station 104b, the current data rate 312a via the group owner (GO) 102 and the potential data rate 312b via a tunneled direct link setup (TDLS) direct link 108.

The client station 304 may also use the channel availability 314 to determine whether to set up a tunneled direct link setup (TDLS) direct link 108. The channel availability 314 may include the channels that are available for the tunneled direct link setup (TDLS) direct link 108. The client station may receive a tunneled direct link setup (TDLS) setup request 316. The received tunneled direct link setup (TDLS) setup request 316 may be received from the group owner (GO) 102. The received tunneled direct link setup (TDLS) setup request 316 may have been generated by another client station 104. In one configuration, the received tunneled direct link setup (TDLS) setup request 316 may have been generated by the group owner (GO) 102.

The client station 304 may also use the communications with client stations 104 via the group owner (GO) 102 forwarding latency 318 to determine whether to set up a tunneled direct link setup (TDLS) direct link 108. The communications with client stations 104 via the group owner (GO) 102 latency 318 may refer to the delays that are experienced when communicating with a client station 104 via the group owner (GO) 102. For example, the first client station 104a may send a message destined for the second client station 104b to the group owner (GO) 102 using the first peer to peer (P2P) wireless fidelity (Wi-Fi) link 106a. Upon receiving the message, the group owner (GO) 102 may forward the message to the second client station 104b using the second peer to peer (P2P) wireless fidelity (Wi-Fi) link 106b. Depending on the measured delays, it may become more efficient to set up a tunneled direct link setup (TDLS) direct link 108 between the first client station 104a and the second client station 104b.

Figure 4:
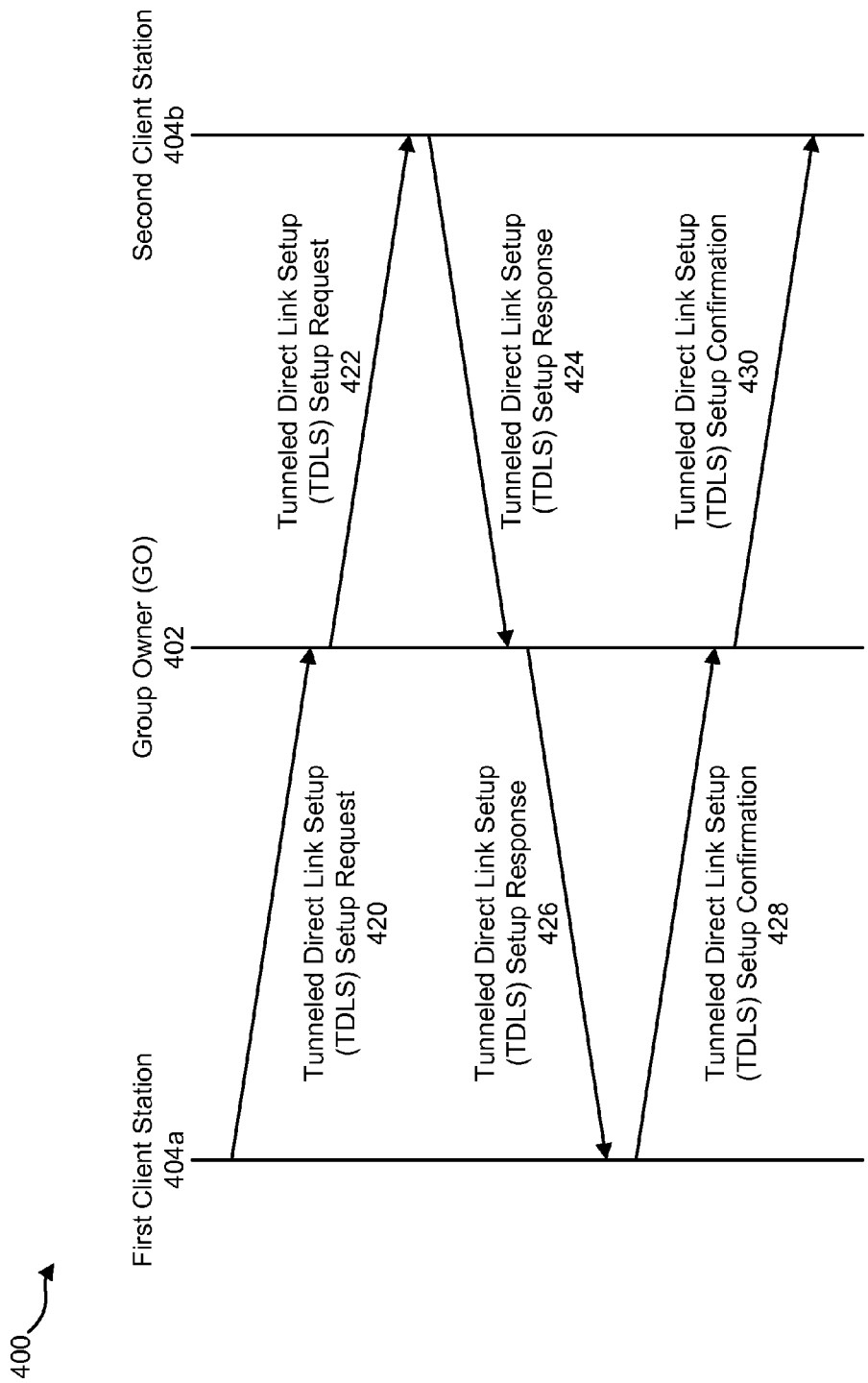
FIG. 4 illustrates transmission schemes between a first client station, a second client station and a group owner (GO) for setting up a tunneled direct link setup (TDLS) direct link.

FIG. 4 illustrates transmission schemes 400 between a first client station 404a, a second client station 404b and a group owner (GO) 402 for setting up a tunneled direct link setup (TDLS) direct link 108. The first client station 404a, the group owner (GO) 402 and the second client station 404b of FIG. 4 may be one configuration of the first client station 104a, the group owner (GO) 102 and the second client station 104b of FIG. 1. The first client station 404a may determine to set up a tunneled direct link setup (TDLS) direct link 108 with the second client station 404b. As discussed above, the first client station 404a may determine whether to set up a tunneled direct link setup (TDLS) direct link 108 based on many factors, including received signal strengths 310, data rates 312, channel availability 314 and latency 318.

Once the first client station 404a has determined to set up a tunneled direct link setup (TDLS) direct link 108, the first client station 404a may send a tunneled direct link setup (TDLS) setup request 420 to the group owner (GO) 402 using the first peer to peer (P2P) wireless fidelity (Wi-Fi) link 106a. The tunneled direct link setup (TDLS) setup request 420 may include the intended recipient (the second client station 404b), information about the requested link, the data rate, the channel and the bandwidth capabilities of the first client station 404a. The frame body of a tunneled direct link setup (TDLS) setup request 420 may include the information shown in Table 1 below (with references to IEEE P802.11z/D8.0, Draft Standard for Information Technology—Telecommunications and information exchange between systems—Local and metropolitan area networks—Specific requirements—Part 11: Wireless Medium Access Control (MAC) and physical layer (PHY) specifications, Amendment 7: Extensions to Direct Link Setup).

TABLE 1

| Order | Information | Notes |
|---|---|---|
| 1 | Category | The Category field is set to the value for TDLS, as defined in Table 7-24. |
| 2 | Action | The Action field is set to 0, representing TDLS Setup Request. |
| 3 | Dialog Token | The Dialog Token field contains a unique non-zero value for the conversation between the STAs involved in this request. The Dialog Token is specified in 7.3.1.12. |
| 4 | Capability | The Capability field indicates the capabilities of the STA. The Capability field is defined in 7.3.1.4. |
| 5 | Supported | The Supported Rates element indicates the |

TABLE 1-continued

| Order | Information | Notes |
|---|---|---|
| | rates | rates which are supported by the STA. The Supported Rates element is defined in 7.3.2.2. |
| 6 | Country | The Country information element shall be present when dot11MultiDomainCapabilityEnabled is true or dot11SpectrumManagementRequired is true. The Country information element is defined in 7.3.2.9. |
| 7 | Extended supported rates | The Extended Supported Rates element is present whenever there are more than eight supported rates, and it is optional otherwise. The Extended Supported Rates element is defined in 7.3.2.14. |
| 8 | Supported Channels | The Supported Channels element is defined in 7.3.2.19 (optional). Included if the TDLS channel switching capability field is set to one. |
| 9 | RSNIE | RSNIE of the TDLS initiator STA (optional). The RSNIE is included if security is required on the direct link. The RSNIE is defined in 7.3.2.25. |
| 10 | Extended Capabilities | The Extended Capabilities element may be present if any of the fields in this element are non-zero. The Extended Capabilities element is defined in 7.3.2.27. |
| 11 | QoS Capability | The QoS Capability element is present when dot11QosOptionImplemented is true. The QoS Capability element is defined in 7.3.2.35. |
| 12 | FTIE | FTIE of the TDLS Initiator (optional). The FTIE is included if security is required on the direct link. The FTIE is defined in 7.3.2.48. |
| 13 | Timeout Interval | The Timeout Interval element contains the TPK Key Lifetime (optional). Included if security is required on the direct link. The Timeout Interval element is defined in 7.3.2.49. |
| 14 | Supported Regulatory Classes | The Supported Regulatory Classes element is defined in 7.3.2.51 (optional). Included if the TDLS channel switching capability field is set to one. |
| 15 | HT Capabilities | The HT Capabilities element is present when the dot11HighThroughputOptionImplemented attribute is true. The HT Capabilities element is defined in 7.3.2.56. |
| 16 | 20/40 BSS Coexistence | The 20/40 BSS Coexistence element may appear in this frame. The 20/40 BSS Coexistence element is defined in 7.3.2.60. |
| 17 | Link Identifier | The Link Identifier is specified in 7.3.2.62. |

Upon receiving the tunneled direct link setup (TDLS) setup request 420, the group owner (GO) 402 may forward the received tunneled direct link setup (TDLS) setup request 422 to the second client station 404b. In one configuration, the group owner (GO) 402 may forward the received tunneled direct link setup (TDLS) setup request 422 to the second client station 404b using the second peer to peer (P2P) wireless fidelity (Wi-Fi) link 106b.

The second client station 404b may then generate a tunneled direct link setup (TDLS) setup response 424. The tunneled direct link setup (TDLS) setup response 424 may include the bandwidth capabilities of the second client station 404b. The tunneled direct link setup (TDLS) setup response 424 may be encapsulated in a data frame and may include the information shown in Table 2 below (with references to IEEE P802.11z/D8.0, Draft Standard for Information Technology—Telecommunications and information exchange between systems—Local and metropolitan area networks—Specific requirements—Part 11: Wireless Medium Access Control (MAC) and physical layer (PHY) specifications, Amendment 7: Extensions to Direct Link Setup).

TABLE 2

| Order | Information | Notes |
|---|---|---|
| 1 | Category | The Category field is set to the value for TDLS, as defined in Table 7-24. |
| 2 | Action | The Action field is set to 1, representing TDLS Setup Response. |
| 3 | Status Code | The Status Code is defined in 7.3.1.9. |
| 4 | Dialog Token | The Dialog Token is copied from the corresponding TDLS Setup Request. The Dialog Token is specified in 7.3.1.12. |
| 5 | Capability | The Capability field indicates the capabilities of the STA. The Capability field is defined in 7.3.1.4. Included for Status Code 0 (Successful). |
| 6 | Supported rates | The Supported Rates element indicates the rates which are supported by the STA. The Supported Rates element is defined in 7.3.2.2. Included for Status Code 0 (Successful). |
| 7 | Country | The Country information element shall be present when dot11MultiDomainCapabilityEnabled is true or dot11SpectrumManagementRequired is true. The Country information element is defined in 7.3.2.9 |
| 8 | Extended supported rates | The Extended Supported Rates element is present whenever there are more than eight supported rates, and it is optional otherwise. Included for Status Code 0 (Successful). The Extended Supported Rates element is defined in 7.3.2.14. |
| 9 | Supported Channels | The Supported Channels element is defined in 7.3.2.19. Included if the TDLS channel switching capability bit is set to one. Included for Status Code 0 (Successful). |
| 10 | RSNIE | RSNIE of the TDLS responder STA (optional). The RSNIE is included if security is required on the direct link and the Status Code is 0 (Successful). The RSNIE is defined in 7.3.2.25. |
| 11 | Extended Capabilities | The Extended Capabilities element may be present if any of the fields in this element are non-zero. Included for Status Code 0 (Successful). The Extended Capabilities element is defined in 7.3.2.27. |
| 12 | QoS Capability | The QoS Capability element is present when dot11QosOptionImplemented is true and if the Status Code is 0 (Successful). The QoS Capability element is defined in 7.3.2.35. |
| 13 | FTIE | FTIE of the TDLS responder STA (optional). The FTIE is included if security is required on the TDLS direct link and the Status Code is 0 (Successful). The FTIE is defined in 7.3.2.48. |
| 14 | Timeout Interval IE | TPK Key Lifetime (optional) Included if security is required on the direct link. Included for Status Code 0 (Successful). The Timeout Interval element is defined in 7.3.2.49. |
| 15 | Supported Regulatory Classes | The Supported Regulatory Classes element is defined in 7.3.2.54. Included if the TDLS channel switching capability bit is set to one. Included for Status Code 0 (Successful). |
| 16 | HT Capabilities | The HT Capabilities element is present when the dot11HighThroughputOptionImplemented attribute is true and if the Status Code is 0 (Successful). The HT Capabilities element is defined in 7.3.2.56. |
| 17 | 20/40 BSS Coexistence | The 20/40 BSS Coexistence element may appear in this frame. Included for Status Code 0 (Successful). The 20/40 BSS Coexistence element is defined in 7.3.2.60. |

The second client station 404*b* may send the tunneled direct link setup (TDLS) setup response 424 to the group owner (GO) 402 using the second peer to peer (P2P) wireless fidelity (Wi-Fi) link 106*b*.

Upon receiving the tunneled direct link setup (TDLS) setup response 424, the group owner (GO) 402 may forward the tunneled direct link setup (TDLS) setup response 426 to the first client station 404*a* using the first peer to peer (P2P) wireless fidelity (Wi-Fi) link 106*a*. The first client station 404*a* may then generate a tunneled direct link setup (TDLS) setup confirmation 428. The tunneled direct link setup (TDLS) setup confirmation 428 may include specific information about the tunneled direct link setup (TDLS) direct link 108 to be established, such as the channel to be used, the frequency to be used, timing structures to be used, quality of service (QOS) capabilities, security information, etc.

The first client station 404*a* may send the tunneled direct link setup (TDLS) setup confirmation 428 to the group owner using the first peer to peer (P2P) wireless fidelity (Wi-Fi) link 106*a*. The frame body of a tunneled direct link setup (TDLS) setup confirmation 428 frame may include the information shown in Table 3 below (with references to IEEE P802.11z/D8.0, Draft Standard for Information Technology—Telecommunications and information exchange between systems—Local and metropolitan area networks—Specific requirements—Part 11: Wireless Medium Access Control (MAC) and physical layer (PHY) specifications, Amendment 7: Extensions to Direct Link Setup).

TABLE 3

| Order | Information | Notes |
|---|---|---|
| 1 | Category | The Category field is set to the value for TDLS, as defined in Table 7-24. |
| 2 | Action | The Action field is set to 2, representing TDLS Setup Confirm. |
| 3 | Status Code | The Status Code is defined in 7.3.1.9. |
| 4 | Dialog Token | The Dialog Token is copied from the corresponding TDLS Setup Response. The Dialog Token is specified in 7.3.1.12. |
| 5 | RSNIE | RSNIE (optional). Included if security is required on the direct link and the Status Code is 0 (Successful). The RSNIE is defined in 7.3.2.25. |
| 6 | EDCA Parameter Set | The EDCA parameter set is included when QoS is supported on the direct link. The EDCA Parameter Set element is specified in 7.3.2.29. Included for Status Code 0 (Successful). |
| 7 | FTIE | FTIE of the TDLS initiator STA (optional). The FTIE is included if security is required on the direct link and the Status Code is 0 (Successful). The FTIE is defined in 7.3.2.48. |
| 8 | Timeout Interval IE | TPK Key Lifetime (optional) Included if security is required on the direct link. Included for Status Code 0 (Successful). The Timeout Interval element is defined in 7.3.2.49. |
| 9 | HT Operation | The HT Operation element is included when dot11HighThroughputOptionImplemented attribute is true and the TDLS Setup Response frame contained an HT Capabilities element (optional). Included for Status Code 0 (Successful). The HT Operation element is defined in 7.3.2.57. |
| 10 | Link Identifier | The Link Identifier is specified in 7.3.2.62. |

Upon receiving the tunneled direct link setup (TDLS) setup confirmation 428, the group owner (GO) 402 may forward the tunneled direct link setup (TDLS) setup confirmation 430 to the second client station 404*b* using the second peer to peer (P2P) wireless fidelity (Wi-Fi) link 106*b*. The first client station 404*a* and the second client station 404*b* may then begin communicating with each other using the tunneled direct link setup (TDLS) direct link 108.

Figure 5:
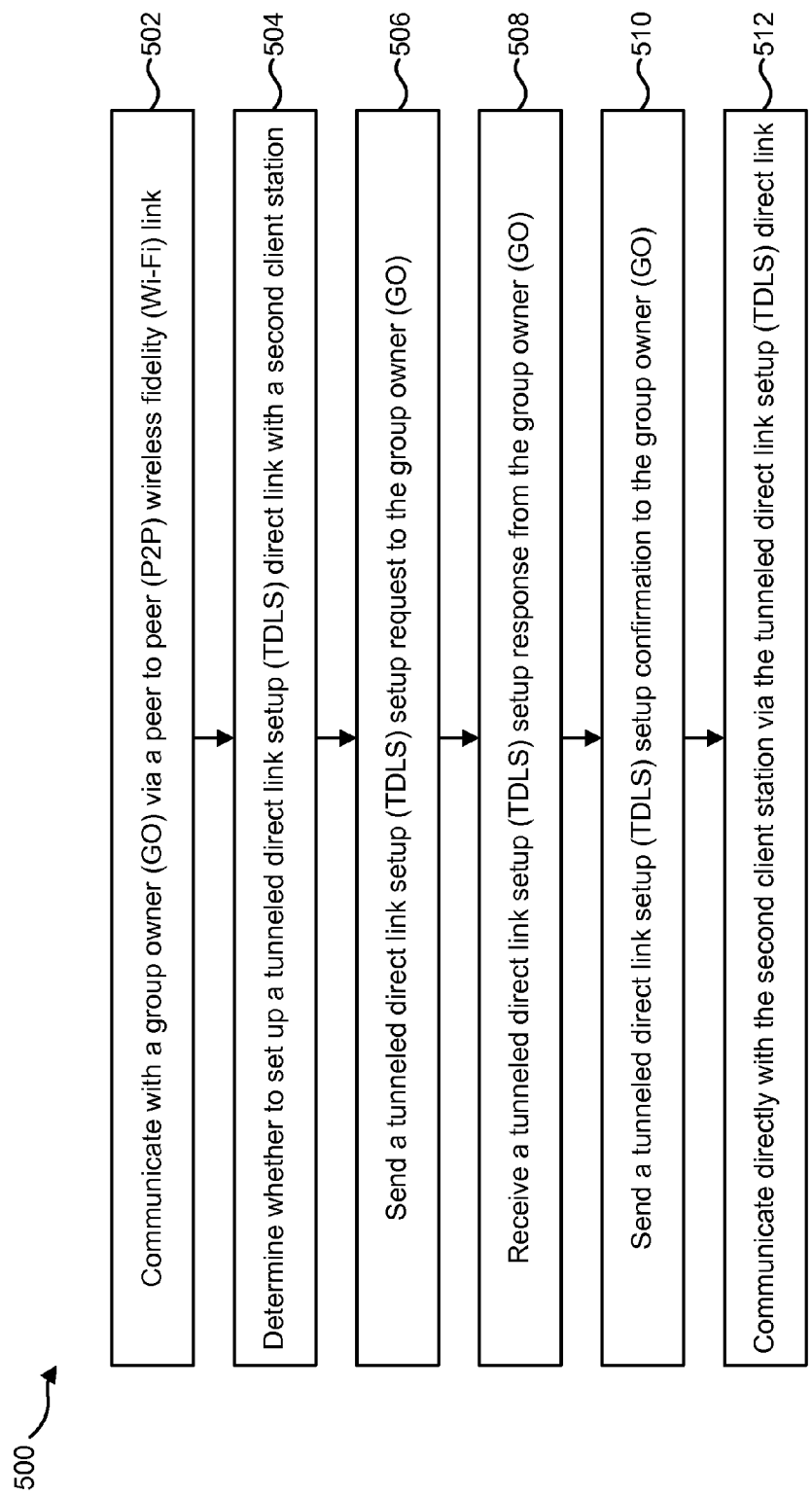
FIG. 5 is a flow diagram of a method for setting up a tunneled direct link setup (TDLS) direct link between a first client station and a second client station where the first client station sends a tunneled direct link setup (TDLS) setup request.

FIG. 5 is a flow diagram of a method 500 for setting up a tunneled direct link setup (TDLS) direct link 108 between a first client station 404*a* and a second client station 404*b* where the first client station 404*a* sends a tunneled direct link setup (TDLS) setup request 422. The method 500 may be performed by a first client station 404a. The first client station 404a may communicate 502 with a group owner (GO) 402 via a first peer to peer (P2P) wireless fidelity (Wi-Fi) link 106a. The first client station 404a may determine 504 whether to set up a tunneled direct link setup (TDLS) direct link 108 with a second client station 404b. As discussed above in relation to FIG. 3, the first client station 404a may determine 504 whether to set up a tunneled direct link setup (TDLS) direct link 108 based on one or more factors, including received signal strength 310, data rates 312, channel availability 314 and latency 318.

The first client station 404a may then send 506 a tunneled direct link setup (TDLS) setup request 420 to the group owner (GO) 402. The tunneled direct link setup (TDLS) setup request 420 may include information about the proposed tunneled direct link setup (TDLS) direct link 108. For example, the tunneled direct link setup (TDLS) setup request 420 may specify the client station 404 that a tunneled direct link setup (TDLS) direct link 108 is requested with, the channel for the tunneled direct link setup (TDLS) direct link 108 and/or the proposed duration of the tunneled direct link setup (TDLS) direct link 108.

The first client station 404a may receive 508 a tunneled direct link setup (TDLS) setup response 426 from the group owner (GO) 402. The first client station 404a may send 510 a tunneled direct link setup (TDLS) setup confirmation 428 to the group owner (GO) 402. The first client station 404a may then communicate 512 directly with the second client station 404b via the tunneled direct link setup (TDLS) direct link 108. The first client station 404a may continue to communicate 502 with the group owner (GO) 402 via the first peer to peer (P2P) wireless fidelity (Wi-Fi) link 108 while communicating 512 directly with the second client station 404b via the tunneled direct link setup (TDLS) direct link 108.

Figure 6:
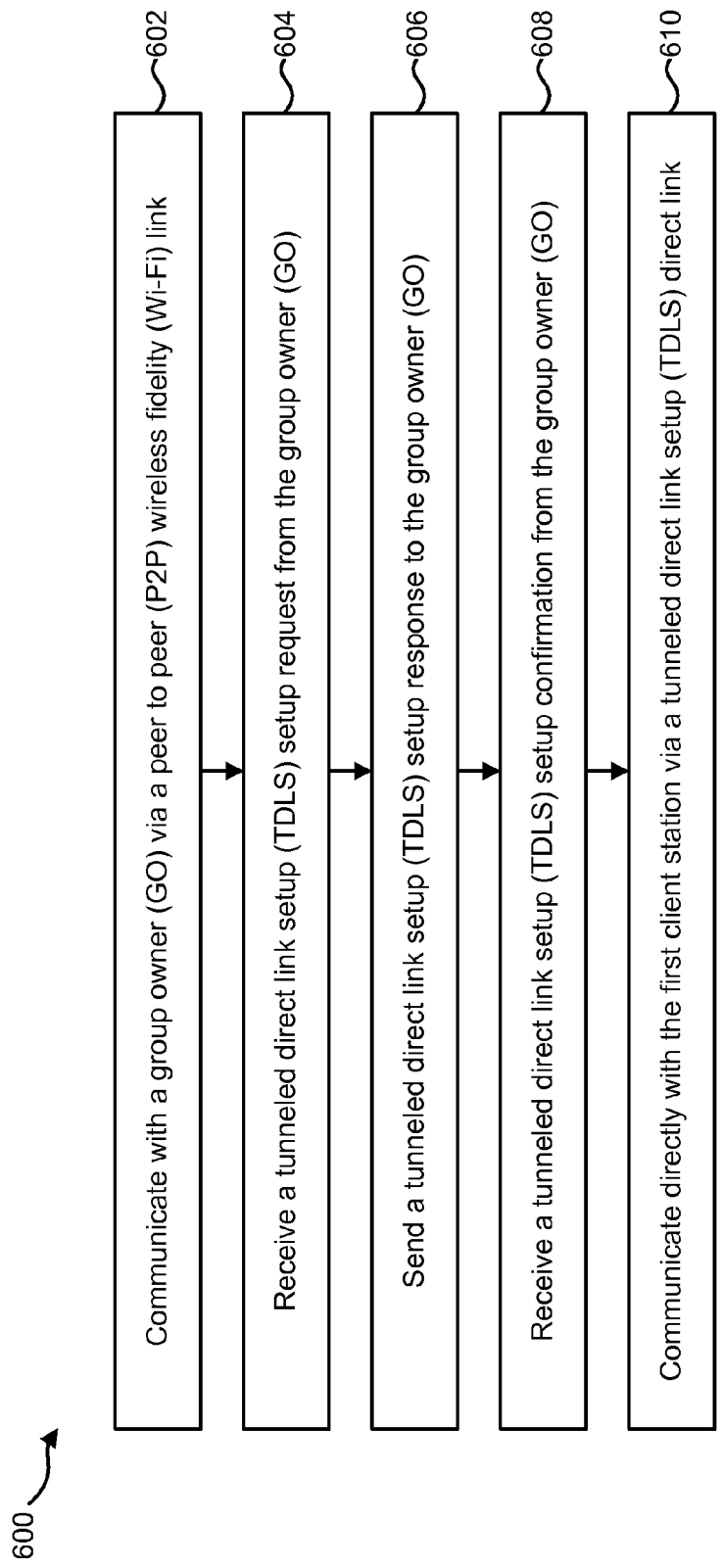
FIG. 6 is a flow diagram of a method for setting up a tunneled direct link setup (TDLS) direct link between a first client station and a second client station where a tunneled direct link setup (TDLS) setup request is received from the group owner (GO)

FIG. 6 is a flow diagram of a method 600 for setting up a tunneled direct link setup (TDLS) direct link 108 between a first client station 404a and a second client station 404b where a tunneled direct link setup (TDLS) setup request 422 is received from the group owner (GO) 402. The method 600 may be performed by a client station 404. In one configuration, the method 600 may be performed by the second client station 404b of FIG. 4 to set up a tunneled direct link setup (TDLS) direct link 108 with the first client station 404a of FIG. 4. The second client station 404b may communicate 602 with a group owner (GO) 402 via a peer to peer wireless fidelity (Wi-Fi) link 106b. The second client station 404b may then receive 604 a tunneled direct link setup (TDLS) setup request 422 from the group owner (GO) 402. The tunneled direct link setup (TDLS) setup request 422 may have been generated by the first client station 404a.

The second client station 404b may send 606 a tunneled direct link setup (TDLS) setup response 424 to the group owner (GO) 402. The tunneled direct link setup (TDLS) setup response 424 may indicate that the second client station 404b is capable of establishing a tunneled direct link setup (TDLS) direct link 108 with the first client station 404a. In one configuration, the tunneled direct link setup (TDLS) setup response 424 may indicate to the group owner (GO) 402 that the intended recipient is the first client station 404a.

The second client station 404b may then receive 608 a tunneled direct link setup (TDLS) setup confirmation 430 from the group owner (GO) 402. The tunneled direct link setup (TDLS) setup confirmation 430 may have been generated by the first client station 404a. After receiving the tunneled direct link setup (TDLS) setup confirmation 430, the second client station 404b may communicate 610 direct with the first client station 404a via a tunneled direct link setup (TDLS) direct link 108. The second client station 404b may communicate 602 with the group owner (GO) 402 via the peer to peer (P2P) wireless fidelity (Wi-Fi) link 106b while also communicating 610 directly with the first client station 404a via the tunneled direct link setup (TDLS) direct link 108.

Figure 7:
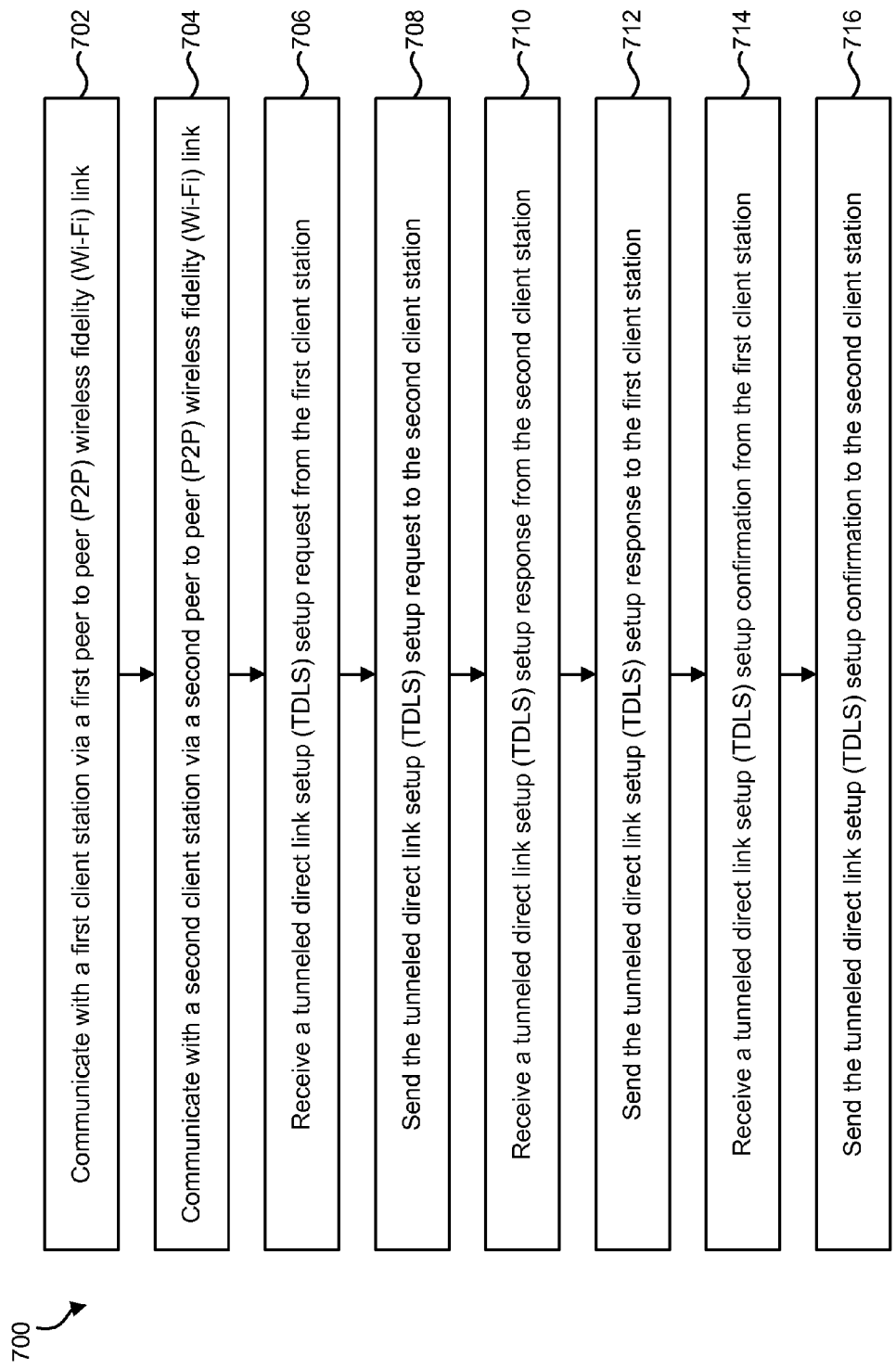
FIG. 7 is a flow diagram of yet another method for setting up a tunneled direct link setup (TDLS) direct link between a first client station and a second client station where a tunneled direct link setup (TDLS) setup request is sent by the first client station.

FIG. 7 is a flow diagram of yet another method 700 for setting up a tunneled direct link setup (TDLS) direct link 108 between a first client station 404a and a second client station 404b where a tunneled direct link setup (TDLS) setup request 422 is sent by the first client station 404a. The method 700 may be performed by a group owner (GO) 402. The group owner (GO) 402 may communicate 702 with a first client station 404a via a first peer to peer (P2P) wireless fidelity (Wi-Fi) link 106a. The group owner (GO) 402 may also communicate 704 with a second client station 404b via a second peer to peer (P2P) wireless fidelity (Wi-Fi) link 106b. The group owner (GO) 402 may receive 706 a tunneled direct link setup (TDLS) setup request 420 from the first client station 404a. The tunneled direct link setup (TDLS) setup request 420 may indicate that the second client station 404b is to receive the tunneled direct link setup (TDLS) setup request 420. The tunneled direct link setup (TDLS) setup request 420 may be received 706 via the first peer to peer (P2P) wireless fidelity (Wi-Fi) link 106a.

The group owner (GO) 402 may then send 708 the tunneled direct link setup (TDLS) setup request 422 to the second client station 404b using the second peer to peer (P2P) wireless fidelity (Wi-Fi) link 108. The group owner (GO) 402 may next receive 710 a tunneled direct link setup (TDLS) setup response 424 from the second client station 404b via the second peer to peer (P2P) wireless fidelity (Wi-Fi) link 106. The tunneled direct link setup (TDLS) setup response 424 may indicate that the first client station 404a is to receive the tunneled direct link setup (TDLS) setup response 424. The group owner (GO) 402 may send 712 the tunneled direct link setup (TDLS) setup response 426 to the first client station 404a via the first peer to peer (P2P) wireless fidelity (Wi-Fi) link 108.

The group owner (GO) 402 may receive 714 a tunneled direct link setup (TDLS) setup confirmation 428 from the first client station 404a via the first peer to peer (P2P) wireless fidelity (Wi-Fi) link 108. The tunneled direct link setup (TDLS) setup confirmation 428 may indicate that the second client station 404b is to receive the tunneled direct link setup (TDLS) setup confirmation 428. The group owner (GO) 402 may then send 716 the tunneled direct link setup (TDLS) setup confirmation 430 to the second client station 404b via the second peer to peer (P2P) wireless fidelity (Wi-Fi) link 108.

Figure 8:
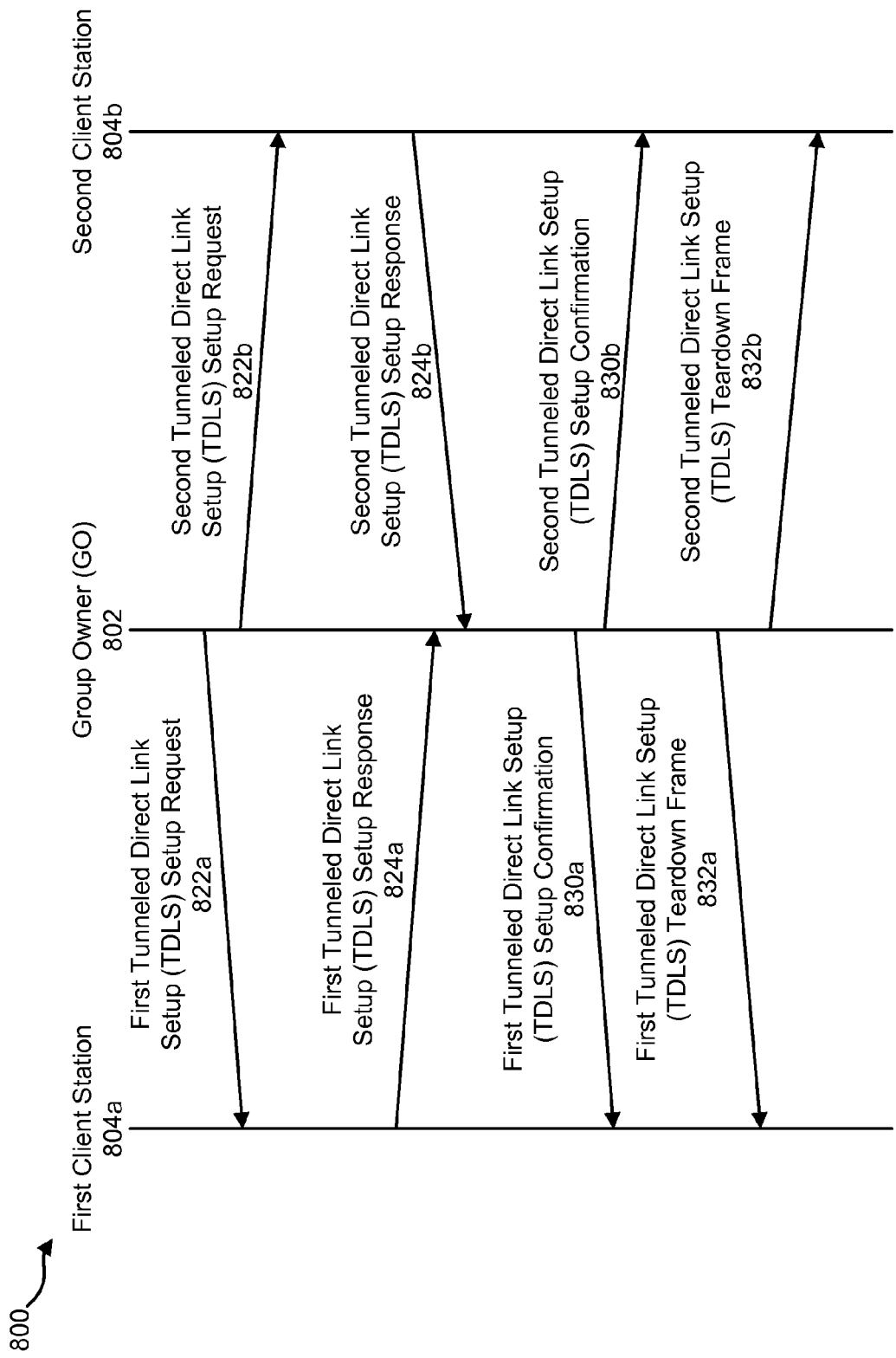
FIG. 8 illustrates transmission schemes between a group owner (GO), a first client station and a second client station for setting up a tunneled direct link setup (TDLS) direct link initiated by the group owner (GO)

FIG. 8 illustrates transmission schemes 800 between a group owner (GO) 802, a first client station 804a and a second client station 804b for setting up a tunneled direct link setup (TDLS) direct link 108 initiated by the group owner (GO) 802. The group owner (GO) 804, first client station 804a and second client station 804b of FIG. 8 may be one configuration of the group owner (GO) 102, first client station 104a and second client station 104b of FIG. 1. The group owner (GO) 802 may communicate with the first client station 804a using a first peer to peer (P2P) wireless fidelity (Wi-Fi) link 106a. The group owner (GO) 802 may also communicate with the second client station 404b using a second peer to peer (P2P) wireless fidelity (Wi-Fi) link 106b. The group owner (GO) 802 may be direct link aware. A group owner (GO) 802 that is direct link aware either understands signaling messages sent from one client to another or initiates the set up of a direct link between the two clients.

The group owner (GO) 802 may initiate the set up of a direct link between the first client station 804a and the second client station 804b using tunneled direct link setup (TDLS) signaling frames. Alternatively, other direct link setup protocols such as direct link setup (TDLS) may be used. The group owner (GO) 802 may send a first tunneled direct link setup (TDLS) setup request 822a to the first client station 804a via the first peer to peer (P2P) wireless fidelity (Wi-Fi) link 106a. The first tunneled direct link setup (TDLS) setup request 822a may identify the second client station 804b as the source of the first tunneled direct link setup (TDLS) setup request 822a. The group owner (GO) 802 may also send a second tunneled direct link setup (TDLS) setup request 822b to the second client station 804b. The second tunneled direct link setup (TDLS) setup request 822b may identify the first client station 804a as the source of the second tunneled direct link setup (TDLS) setup request 822b. It may not be necessary for the group owner (GO) 802 to send both the first tunneled direct link setup (TDLS) setup request 822a and the second tunneled direct link setup (TDLS) setup request 822b but if both are sent, the timing of each relative to each other is not be important and may be at different times.

The first client station 804a may send a first tunneled direct link setup (TDLS) setup response 824a to the group owner (GO) 802. The first tunneled direct link setup (TDLS) setup response 824a may be addressed to the second client station 804b. The first tunneled direct link setup (TDLS) setup response 824a may be intercepted by the group owner (GO) 802 and not forwarded to the second client station 804b. The second client station 804b may send a second tunneled direct link setup (TDLS) setup response 824b to the group owner (GO) 802. The second tunneled direct link setup (TDLS) setup response 824b may be addressed to the first client station 804a. The second tunneled direct link setup (TDLS) setup response 824b may be intercepted by the group owner (GO) 802 and not forwarded to the first client station 804a.

The group owner (GO) 802 may then transmit a first tunneled direct link setup (TDLS) setup confirmation 830a to the first client station 804a. The first tunneled direct link setup (TDLS) setup confirmation 830a may identify the second client station 804b as the source of the first tunneled direct link setup (TDLS) setup confirmation 830a. The group owner (GO) 802 may also transmit a second tunneled direct link setup (TDLS) setup confirmation 830b to the second client station 804b. The second tunneled direct link setup (TDLS) setup confirmation 830b may identify the first client station 804a as the source of the second tunneled direct link setup (TDLS) setup confirmation 830b. The tunneled direct link setup (TDLS) direct link 108 may then be set up.

The group owner (GO) 802 may also tear down, dissolve, or end communications via a tunneled direct link setup (TDLS) direct link 108. The group owner (GO) 802 may send a first tunneled direct link setup (TDLS) teardown frame 832a to the first client station. The group owner (GO) 802 may also send a second tunneled direct link setup (TDLS) teardown frame 832b to the second client station 804b. The tunneled direct link setup (TDLS) direct link 108 between the first client station 804a and the second client station 804b may then be canceled. The frame body of a tunneled direct link setup (TDLS) teardown frame 832 may include the information shown in Table 4 below (with references to IEEE P802.11z/D8.0, Draft Standard for Information Technology—Telecommunications and information exchange between systems—Local and metropolitan area networks—Specific requirements—Part 11: Wireless Medium Access Control (MAC) and physical layer (PHY) specifications, Amendment 7: Extensions to Direct Link Setup).

TABLE 4

| Order | Information | Notes |
|---|---|---|
| 1 | Category | The Category field is set to the value for TDLS, as defined in Table 7-24. |
| 2 | Action | The Action field is set to 3, representing TDLS Teardown. |
| 3 | Reason Code | The Reason Code is defined in 7.3.1.7. |
| 4 | FTIE | Included if TPK handshake was successful for this session (optional). The FTIE is defined in 7.3.2.48. |
| 5 | Link Identifier | The Link Identifier is specified in 7.3.2.62. |

Figure 9:
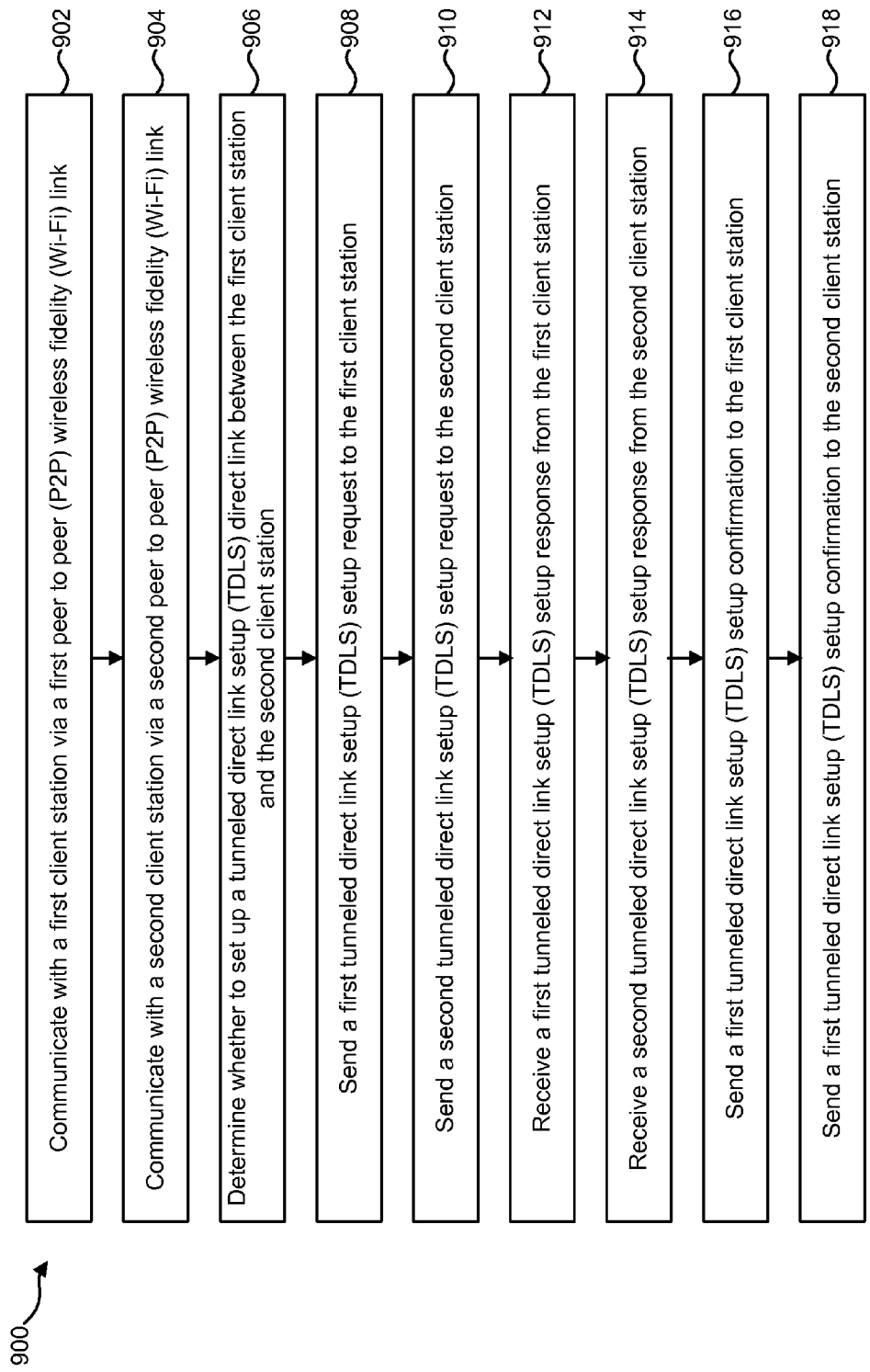
FIG. 9 is a flow diagram of a method for setting up a tunneled direct link setup (TDLS) direct link initiated by a group owner (GO)

FIG. 9 is a flow diagram of a method 900 for setting up a tunneled direct link setup (TDLS) direct link 108 initiated by a group owner (GO) 802. The method 900 may be performed by the group owner (GO) 802. The group owner (GO) 802 may communicate 902 with a first client station 804a via a first peer to peer (P2P) wireless fidelity (Wi-Fi) link 106a. The group owner (GO) 802 may also communicate 904 with a second client station 804b via a second peer to peer (P2P) wireless fidelity (Wi-Fi) link 106b. The group owner (GO) 802 may determine 906 whether to set up a tunneled direct link setup (TDLS) direct link 108 between the first client station 804a and the second client station 804b. Determining 906 whether to set up a tunneled direct link setup (TDLS) direct link 108 by a group owner (GO) 802 may be based on similar specifications as determining 504 whether to set up a tunneled direct link setup (TDLS) direct link 108 by a client station 404: received signal strength 310, data rates 312, channel availability 314 and latency 318.

If it is determined that a tunneled direct link setup (TDLS) direct link 108 should be set up, the group owner (GO) 802 may send 908 a first tunneled direct link setup (TDLS) setup request 822a to the first client station 804a. The first tunneled direct link setup (TDLS) setup request 822a may appear as though it originated from the second client station 804b. The group owner (GO) 802 may also send 910 a second tunneled direct link setup (TDLS) setup request 822b to the second client station 804b. The second tunneled direct link setup (TDLS) setup request 822b may appear as though it originated from the first client station 804a.

The group owner (GO) 802 may then receive 912 a first tunneled direct link setup (TDLS) setup response 824a from the first client station 804a. The first tunneled direct link setup (TDLS) setup response 824a may indicate the second client station 804b as the intended recipient. The group owner (GO) 802 may also receive 914 a second tunneled direct link setup (TDLS) setup response 824b from the second client station 804b. The second tunneled direct link setup (TDLS) setup response 824b may indicate the first client station 804a as the intended recipient.

The group owner (GO) 802 may send 916 a first tunneled direct link setup (TDLS) setup confirmation 830a to the first client station 804a. The group owner (GO) 802 may also send 918 a second tunneled direct link setup (TDLS) setup confirmation 830b to the second client station 804b. A tunneled direct link setup (TDLS) direct link 108 may then be set up between the first client station 804a and the second client station 804b.

Figure 10:
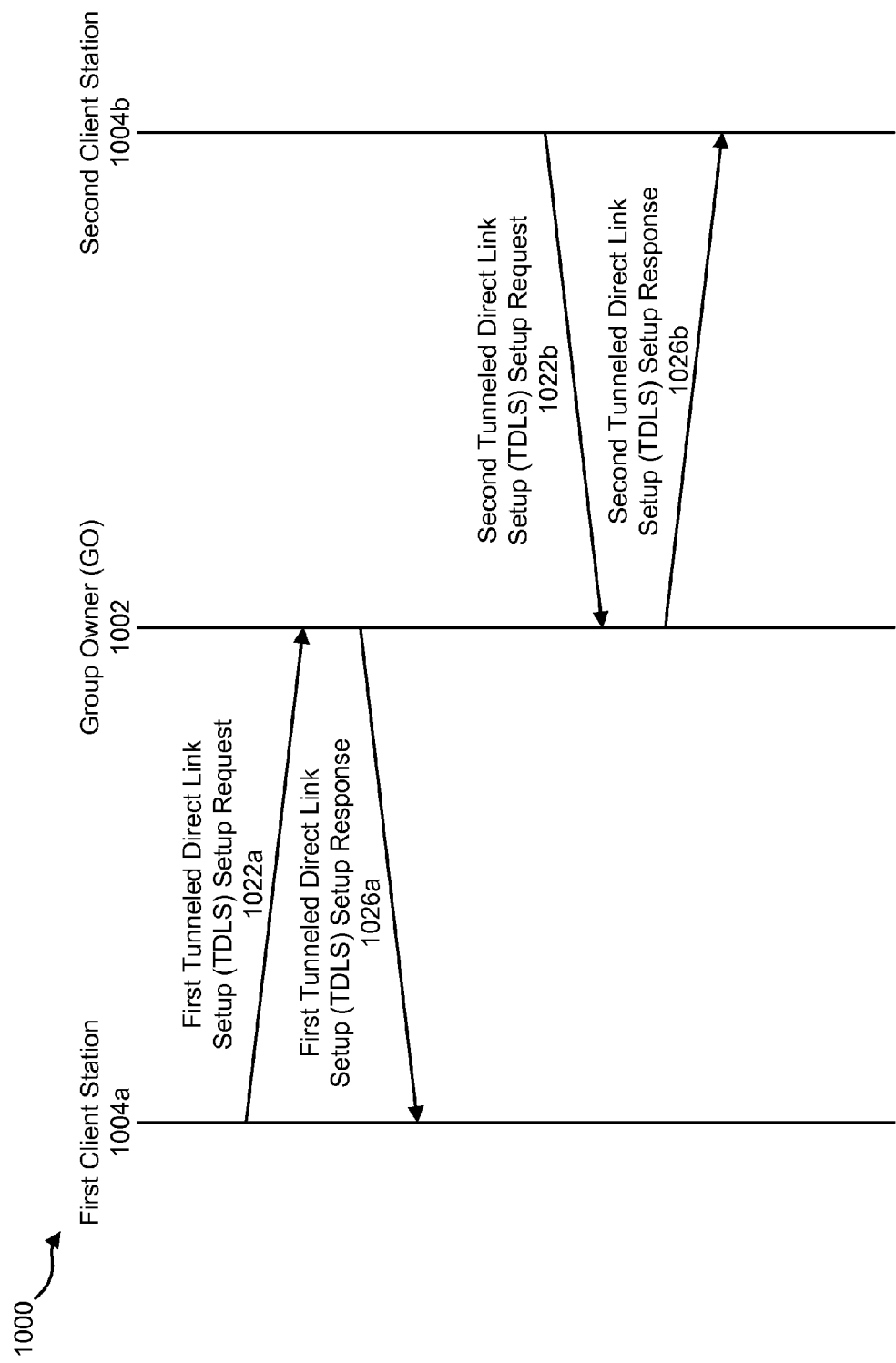
FIG. 10 illustrates transmission schemes between a group owner (GO), a first client station and a second client station for preventing tunneled direct link setup (TDLS) direct links from being set up.

FIG. 10 illustrates transmission schemes 1000 between a group owner (GO) 1002, a first client station 1004a and a second client station 1004b for preventing tunneled direct link setup (TDLS) direct links 108 from being set up. The group owner (GO) 1002, first client station 1004a and second client station 1004b of FIG. 10 may be one configuration of the group owner (GO) 102, first client station 104a and second client station 104b of FIG. 1. The group owner (GO) 1002 may communicate with the first client station 1004a using a first peer to peer (P2P) wireless fidelity (Wi-Fi) link 106. The group owner (GO) 1002 may also communicate with the second client station 1004b using a second peer to peer (P2P) wireless fidelity (Wi-Fi) link 106b.

In order to prevent tunneled direct link setup (TDLS) direct links 108 from being set up in a peer to peer (P2P) network, the group owner (GO) 1002 may filter tunneled direct link setup (TDLS) setup request 1022 messages and send a tunneled direct link setup (TDLS) setup response 1026 message indicating that tunneled direct link setup (TDLS) direct links 108 are not allowed. Tunneled direct link setup (TDLS) direct links 108 may not be allowed for a specific peer to peer (P2P) network, a specific peer to peer (P2P) wireless fidelity (Wi-Fi) network or a basic service set (BSS) because of security and network manageability (e.g., congestion control). For example, an access point (AP) may want to see and/or control all traffic that flows in the basic service set (BSS).

When the group owner (GO) 1002 receives a first tunneled direct link setup (TDLS) setup request 1022a from the first client station 1004a, the group owner (GO) 1002 may send a first tunneled direct link setup (TDLS) setup response 1026a or other appropriate status code to the first client station 1004a indicating that tunneled direct link setup (TDLS) direct links 108 are not allowed. Likewise, when the group owner (GO) 1002 receives a second tunneled direct link setup (TDLS) setup request 1022b from the second client station 1004b, the group owner (GO) 1002 may send a second tunneled direct link setup (TDLS) setup response 1026b or other appropriate status code to the second client station 1004b indicating that tunneled direct link setup (TDLS) direct links 108 are not allowed.

Figure 11:
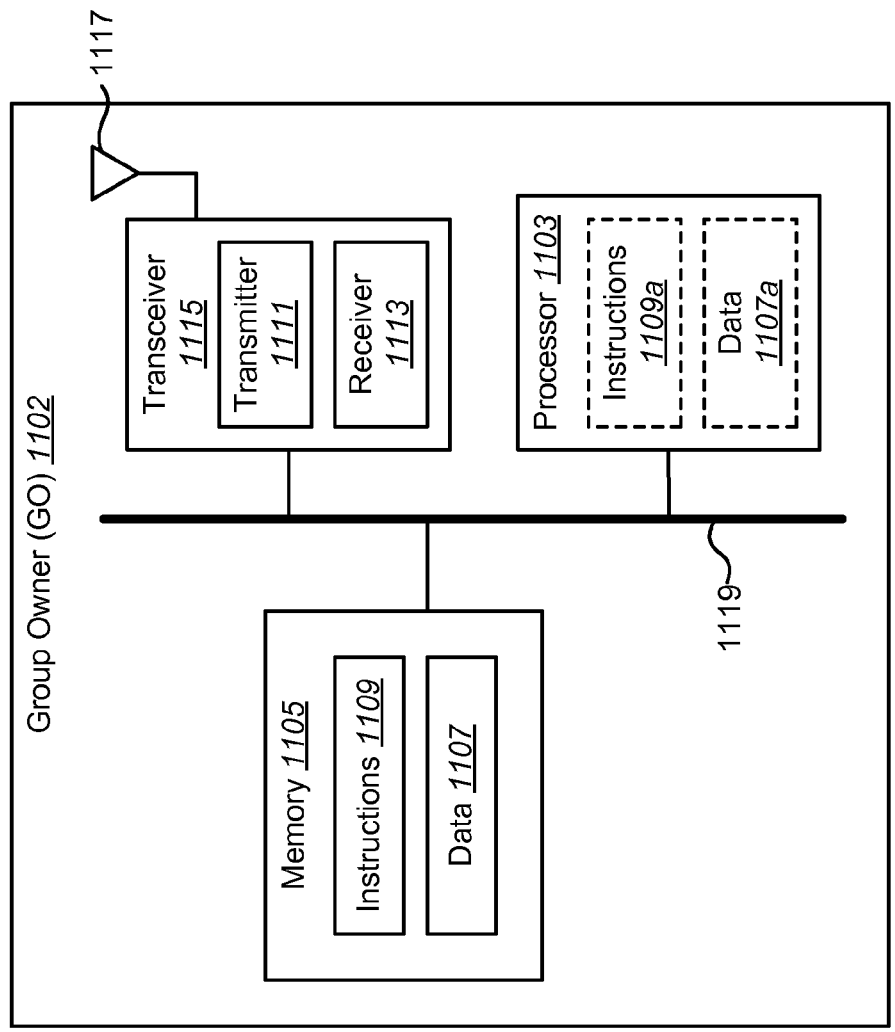
FIG. 11 illustrates certain components that may be included within a group owner (GO) that is configured in accordance with the present disclosure.

FIG. 11 illustrates certain components that may be included within a group owner (GO) 1102. A group owner (GO) 1102 may also be referred to as, and may include some or all of the functionality of, an access point, a broadcast transmitter, a Node B, an evolved Node B, etc. The group owner (GO) 1102 includes a processor 1103. The processor 1103 may be a general purpose single- or multi-chip microprocessor (e.g., an ARM), a special purpose microprocessor (e.g., a digital signal processor (DSP)), a microcontroller, a programmable gate array, etc. The processor 1103 may be referred to as a central processing unit (CPU). Although just a single processor 1103 is shown in the group owner (GO) 1102 of FIG. 11, in an alternative configuration, a combination of processors (e.g., an ARM and DSP) could be used.

The group owner (GO) 1102 also includes memory 1105. The memory 1105 may be any electronic component capable of storing electronic information. The memory 1105 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1107 and instructions 1109 may be stored in the memory 1105. The instructions 1109 may be executable by the processor 1103 to implement the methods disclosed herein. Executing the instructions 1109 may involve the use of the data 1107 that is stored in the memory 1105. When the processor 1103 executes the instructions 1109, various portions of the instructions 1109a may be loaded onto the processor 1103, and various pieces of data 1107a may be loaded onto the processor 1103.

The group owner (GO) 1102 may also include a transmitter 1111 and a receiver 1113 to allow transmission and reception of signals to and from the group owner (GO) 1102. The transmitter 1111 and receiver 1113 may be collectively referred to as a transceiver 1115. An antenna 1117 may be electrically coupled to the transceiver 1115. The group owner (GO) 1102 may also include (not shown) multiple transmitters, multiple receivers, multiple transceivers and/or additional antennas.

The various components of the group owner (GO) 1102 may be coupled together by one or more buses, which may include a power bus, a control signal bus, a status signal bus, a data bus, etc. For the sake of clarity, the various buses are illustrated in FIG. 11 as a bus system 1119.

Figure 12:
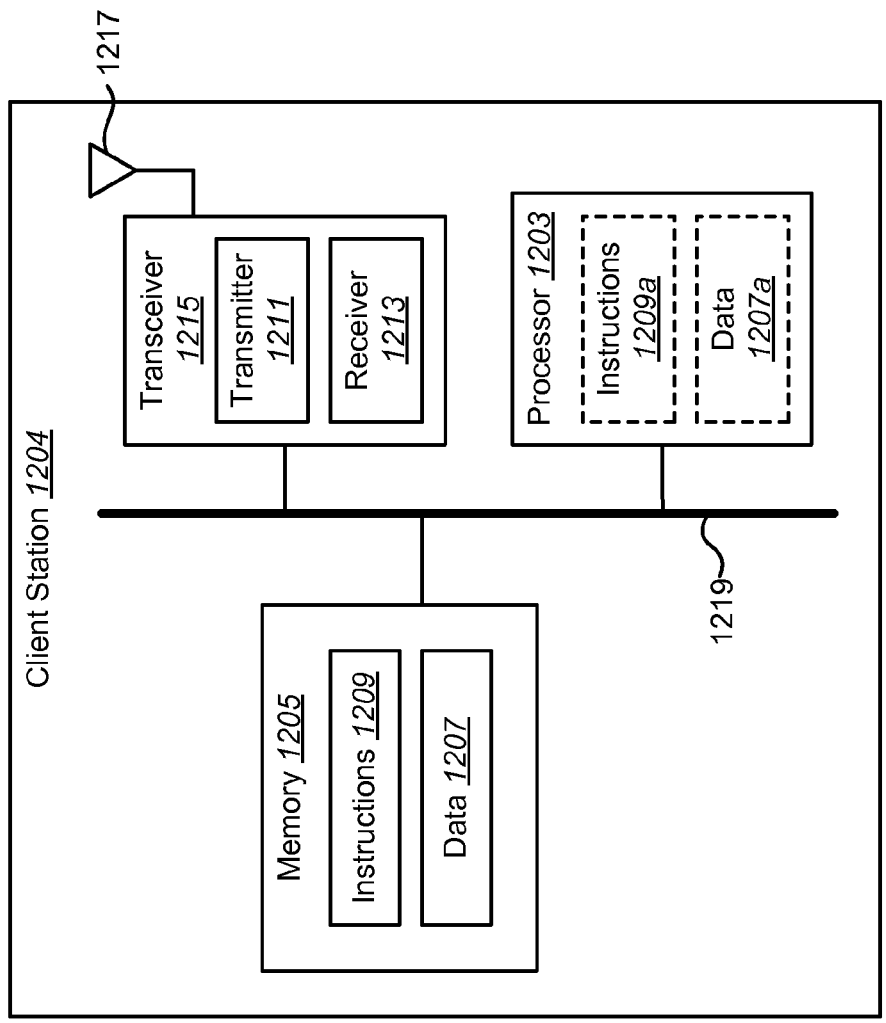
FIG. 12 illustrates certain components that may be included within a client station that is configured in accordance with the present disclosure.

FIG. 12 illustrates certain components that may be included within a client station 1204. The client station 1204 may be an access terminal, a mobile station, a user equipment (UE), etc. The client station 1204 includes a processor 1203. The processor 1203 may be a general purpose single- or multi-chip microprocessor (e.g., an ARM), a special purpose microprocessor (e.g., a digital signal processor (DSP)), a microcontroller, a programmable gate array, etc. The processor 1203 may be referred to as a central processing unit (CPU). Although just a single processor 1203 is shown in the client station 1204 of FIG. 12, in an alternative configuration, a combination of processors (e.g., an ARM and DSP) could be used.

The client station 1204 also includes memory 1205. The memory 1205 may be any electronic component capable of storing electronic information. The memory 1205 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1207 and instructions 1209 may be stored in the memory 1205. The instructions 1209 may be executable by the processor 1203 to implement the methods disclosed herein. Executing the instructions 1209 may involve the use of the data 1207 that is stored in the memory 1205. When the processor 1203 executes the instructions 1209, various portions of the instructions 1209a may be loaded onto the processor 1203, and various pieces of data 1207a may be loaded onto the processor 1203.

The client station 1204 may also include a transmitter 1211 and a receiver 1213 to allow transmission and reception of signals to and from the wireless communication device 1201. The transmitter 1211 and receiver 1213 may be collectively referred to as a transceiver 1215. An antenna 1217 may be electrically coupled to the transceiver 1215. The client station 1204 may also include (not shown) multiple transmitters, multiple receivers, multiple transceivers and/or additional antennas.

The various components of the client station 1204 may be coupled together by one or more buses, which may include a power bus, a control signal bus, a status signal bus, a data bus, etc. For the sake of clarity, the various buses are illustrated in FIG. 12 as a bus system 1219.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2, 5-7 and 9, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for setting up a direct link between a first client station and a second client station, wherein the method is performed by the first client station, the method comprising:
    selecting a third client station as a group owner (GO) of a peer to peer (P2P) wireless network comprising at least the first, second, and third client stations;
    communicating with the GO via a first P2P wireless link;
    determining whether to set up a tunneled direct link setup (TDLS) direct link between the first client station and the second client station based at least in part on a comparison between (a) a first received signal strength measurement of a first wireless signal transmitted from the GO to the first client station, and (b) a second received signal strength measurement of a second wireless signal transmitted from the second client station to the first client station;
    setting up the TDLS direct link between the first client station and the second client station; and
    communicating directly with the second client station via the TDLS direct link.

2. The method of claim 1, wherein the first P2P wireless link is a wireless fidelity (Wi-Fi) link.

3. The method of claim 1, wherein the TDLS setup request is generated at least partially based on network conditions.

4. The method of claim 3, wherein the network conditions comprise the first received signal strength measurement of the first wireless signal transmitted from the GO to the first client station, the second received signal strength measurement of the second wireless signal transmitted from the second client station to the first client station, a current data rate via the GO, or a potential data rate via the TDLS direct link.

5. The method of claim 3, wherein the network conditions comprise channel availability.

6. The method of claim 3, wherein the network conditions comprise a forwarding latency for communications with the second client station via the GO.

7. The method of claim 1, wherein setting up the TDLS direct link comprises:
the receiving of the TDLS setup request from the GO;
sending a TDLS setup response to the GO; and
receiving a TDLS setup confirmation from the GO.

8. The method of claim 7, wherein the TDLS setup request and the TDLS setup confirmation are generated by the second client station.

9. A method for setting up a direct link between a first client station and a second client station, wherein the method is performed by the first client station, the method comprising:
communicating with a group owner (GO) via a first peer to peer (P2P) wireless link;
determining whether to set up a tunneled direct link setup (TDLS) direct link between the first client station and the second client station based at least in part on receiving a TDLS setup request from the GO;
setting up the TDLS direct link between the first client station and the second client station, wherein setting up the TDLS direct link comprises:
the receiving of the TDLS setup request from the GO,
sending a TDLS setup response to the GO, and
receiving a TDLS setup confirmation from the GO; and
communicating directly with the second client station via the TDLS direct link,
wherein the TDLS setup request and the TDLS setup confirmation are generated by the GO.

10. The method of claim 1, wherein the TDLS setup request comprises the intended recipient and information about the TDLS direct link.

11. The method of claim 1, wherein setting up the TDLS direct link comprises: transmitting a TDLS setup response to the GO, the TDLS setup confirmation comprising a channel for the TDLS direct link, a frequency for the TDLS direct link, or timing structures for the TDLS direct link.

12. The method of claim 1, further comprising receiving a TDLS teardown frame from the GO, wherein the TDLS teardown frame ends communication via the TDLS direct link.

13. The method of claim 2, wherein the second client station communicates with the GO via a second P2P Wi-Fi link.

14. The method of claim 1, wherein the TDLS setup response indicates that TDLS direct links are not allowed and a TDLS direct link is not set up.

15. The method of claim 1, further comprising receiving a TDLS teardown frame from the GO, wherein the TDLS teardown frame dissolves the TDLS direct link.

16. A method for controlling the setup of direct links by a group owner, the method comprising:
communicating with a first client station via a first peer to peer (P2P) wireless link;
communicating with a second client station via a second P2P wireless link;
sending a first TDLS setup request to the first client station;
receiving a first TDLS setup response from the first client station, wherein the second client station is the intended recipient of the first TDLS setup response, wherein the first TDLS response not being forwarded by the GO to the second client station; and
sending a first TDLS setup confirmation to the first client station.

17. The method of claim 16, wherein the first P2P wireless link is a wireless fidelity (Wi-Fi) link, and wherein the second P2P wireless link is a Wi-Fi link.

18. The method of claim 16, wherein the first TDLS setup request is received from the third client station, wherein the first TDLS setup confirmation is received from a third client station and further comprising sending the first TDLS setup response to the third client station.

19. A method for controlling the setup of direct links by a group owner, the method comprising:
communicating with a first client station via a first peer to peer (P2P) wireless link;
communicating with a second client station via a second P2P wireless link;
sending a first TDLS setup request to the first client station, wherein the first TDLS setup request is received from the second client station;
receiving a first TDLS setup response from the first client station;
sending a first TDLS setup confirmation to the first client station, wherein the first TDLS setup confirmation is received from the second client station;
sending a first TDLS teardown frame to the first client station;
sending a second TDLS teardown frame to the second client station; and
sending the first TDLS setup response to the second client station.

20. A method for controlling the setup of direct links by a group owner, the method comprising:
communicating with a first client station via a first peer to peer (P2P) wireless link;
communicating with a second client station via a second P2P wireless link;
sending a first TDLS setup request to the first client station, wherein the first TDLS setup request is generated by the GO;
receiving a first TDLS setup response from the first client station;
sending a first TDLS setup confirmation to the first client station, wherein the first TDLS setup confirmation is generated by the GO sending a second TDLS setup request to the second client station;
receiving a second TDLS setup response from the second client station; and
sending a second TDLS setup confirmation to the second client station.

21. The method of claim 20, wherein the first client station is the intended recipient of the second TDLS response, and wherein the GO does not forward the second TDLS response to the first client station.

22. The method of claim 20, wherein the second TDLS setup response is generated by the second client station.

23. A wireless device to set up a direct link, comprising:
a processor;
memory in electronic communication with the processor storing instructions executable by the processor to:
communicate with a group owner (GO) via a first peer to peer (P2P) wireless link;
determine whether to set up a tunneled direct link setup (TDLS) direct link between a first client station and a second client station based at least in part on a comparison between (a) a first received signal strength measurement of a first wireless signal transmitted from the GO to the first client station, and (b) a second received signal strength measurement of a second wireless signal transmitted from the second client station to the first client station;

set up the TDLS direct link between the first client station and the second client station; and communicate directly with the second client station via the TDLS direct link.

24. The wireless device of claim 23, wherein the first P2P wireless link comprises a wireless fidelity (Wi-Fi) link.

25. The wireless device of claim 23, wherein said TDLS setup request is generated based on network conditions.

26. The wireless device of claim 25, wherein the network conditions comprise the first received signal strength measurement of the first wireless signal transmitted from the GO to the first client station, the second received signal strength measurement of the second wireless signal transmitted from the GO to the first client station, a current data rate via the GO, or a potential data rate via the TDLS direct link.

27. The wireless device of claim 25, wherein the network conditions comprise channel availability.

28. The wireless device of claim 25, wherein the network conditions comprise a forwarding latency for communications with a third client station via the GO.

29. The wireless device of claim 23, wherein setting up the TDLS direct link comprises:
receiving a TDLS setup request from the GO;
sending a TDLS setup response to the GO; and
receiving a TDLS setup confirmation from the GO.

30. The wireless device of claim 29, wherein the TDLS setup request and the TDLS setup confirmation are generated by a third client station.

31. A wireless device of to set up a direct link, comprising:
a processor;
memory in electronic communication with the processor storing instructions executable by the processor to:
communicate with a group owner (GO) via a first peer to peer (P2P) wireless link;
determine whether to set up a tunneled direct link setup (TDLS) direct link between a first client station and a second client station based at least in part on receiving a TDLS setup request from the GO;
set up the TDLS direct link between the first client station and the second client station, wherein said set up the TDLS direct link comprises:
receive a TDLS setup request from the GO,
send a TDLS setup response to the GO, and
receive a TDLS setup confirmation from the GO; and
communicate directly with the second client station via the TDLS direct link;
wherein the TDLS setup request and the TDLS setup confirmation are generated by the GO.

32. The wireless device of claim 23, wherein the TDLS setup request comprises the intended recipient and information about the TDLS direct link.

33. The wireless device of claim 23, wherein the TDLS setup confirmation comprises a channel for the TDLS direct link, a frequency for the TDLS direct link, or timing structures for the TDLS direct link.

34. The wireless device of claim 23, wherein the instructions are further executable to process a received TDLS teardown frame from the GO, wherein the TDLS teardown frame ends communication via the TDLS direct link.

35. The wireless device of claim 24, wherein the second client station communicates with the GO via a second P2P Wi-Fi link.

36. The wireless device of claim 16, wherein a TDLS setup response indicates that TDLS direct links are not allowed and a TDLS direct link is not set up.

37. The wireless device of claim 23, wherein the instructions are further executable to process a TDLS teardown frame received from the GO, wherein the TDLS teardown frame dissolves the TDLS direct link.

38. The wireless device of claim 23, wherein the wireless device comprises a third client station.

39. A first client station to set up a direct link with a second client station within a peer to peer (P2P) wireless network, comprising:
means for communicating with a group owner (GO) via a first peer to peer (P2P) wireless link;
means for determining whether to set up a tunneled direct link setup (TDLS) direct link between the first client station and a second client station based at least in part on a comparison between (a) a first received signal strength measurement of a first wireless signal transmitted from the GO to the first client station, and (b) a second received signal strength measurement of a second wireless signal transmitted from the second client station to the first client station;
means for setting up the TDLS direct link between the first client station and the second client station; and
means for communicating directly with the second client station via the TDLS direct link.

40. A first client station to set up a direct link, the first client station comprising a non-transitory computer-readable medium having instructions stored thereon executable by one or more processors to:
initiate communication with a group owner (GO) via a first peer to peer (P2P) wireless link;
determine whether to set up a tunneled direct link setup (TDLS) direct link between the first client station and a second client station based at least in part on a comparison between (a) a first received signal strength measurement of a first wireless signal transmitted from the GO to the first client station, and (b) a second received signal strength measurement of a second wireless signal transmitted from the second client station to the first client station;
set up the TDLS direct link between the first client station and the second client station; and
initiate communication directly with the second client station via the TDLS direct link.

* * * * *